(12) United States Patent
Korpinen

(10) Patent No.: US 8,388,768 B2
(45) Date of Patent: Mar. 5, 2013

(54) METHOD FOR PREPARING PATINATION MATERIALS AND PATINATION MATERIAL

(75) Inventor: Tapio Korpinen, Yrjönkatu (FI)

(73) Assignee: Luvata Espoo Oy, Espoo (FI)

( * ) Notice: Subject to any disclaimer, the term of this patent is extended or adjusted under 35 U.S.C. 154(b) by 651 days.

(21) Appl. No.: 10/510,568

(22) PCT Filed: Apr. 7, 2003

(86) PCT No.: PCT/FI03/00258
§ 371 (c)(1), (2), (4) Date: Oct. 8, 2004

(87) PCT Pub. No.: WO03/085169
PCT Pub. Date: Oct. 16, 2003

(65) Prior Publication Data
US 2005/0173027 A1    Aug. 11, 2005

(30) Foreign Application Priority Data
Apr. 9, 2002   (FI) .................................. 20020669

(51) Int. Cl.
*C23C 22/48* (2006.01)
(52) U.S. Cl. ........................................ 148/269; 106/1.18
(58) Field of Classification Search .................. 148/269; 524/121; 106/1.18
See application file for complete search history.

(56) References Cited

U.S. PATENT DOCUMENTS

| | | | | |
|---|---|---|---|---|
| 5,447,561 A | * | 9/1995 | Chiba et al. | 524/121 |
| 5,691,001 A | | 11/1997 | Ainali et al. | 427/398.1 |
| 6,176,905 B1 | * | 1/2001 | Priggemeyer et al. | 106/1.18 |

FOREIGN PATENT DOCUMENTS

| | | |
|---|---|---|
| FI | 36426 | 7/1967 |
| WO | WO 95/29207 | 11/1995 |

OTHER PUBLICATIONS

Patent Abstracts of Japan; vol. 1995 No. 9; Oct. 31, 1995.

* cited by examiner

*Primary Examiner* — Emily M Le
*Assistant Examiner* — Weiping Zhu
(74) *Attorney, Agent, or Firm* — Hodgson Russ LLP

(57) ABSTRACT

The present invention relates to a method for preparing an artificial patination material to substrates, preferably made from copper or copper alloys and a patination material. The raw material is a copper salt, which reacts with an alkali metal hydroxide. The precipitate is dispersed with powerful mixing and an addition of a dispersing agent. An oxidative agent like manganese dioxide is used, and carbon is used as an agent for catalyzing natural patina forming. Metal compounds are used to achieving desired color and/or color tinge. The invention relates also to the corresponding patination material.

39 Claims, No Drawings

METHOD FOR PREPARING PATINATION MATERIALS AND PATINATION MATERIAL

The present invention relates to a method for preparing an artificial patination material having a desired colour and/or colour tinge to substrates, preferably made from copper or copper alloy and a patination material made with the method.

Copper and copper alloys become covered with an oxide film in normal atmospheric conditions. Brown oxide and later patina forms on copper outdoors with a varying rate depending on where and how the surface is exposed. The colour of the patina is green in town and rural climate and bluish-green or blue in sea climate. Copper is known as long-life and service-free material for roofs and facade. Natural patina is the result of metal corrosion in the atmosphere. The patina film has a certain protective effect. It takes many years of exposure for patina to form on a copper substrate. The time is especially long in a clean rural atmosphere, where the green patina may not form at all.

A large number of methods of artificial green patination have been described earlier. U.S. Pat. No. 3,152,927 relates to a method and a paste in which a patina gel is formed of basic copper nitrate and ferric sulfate. Basic copper nitrate is not thermodynamically stable in rainwater but this changes gradually to stable basic copper sulfate. The colour of basic copper sulfate and nitrate is blue and yellow colour compounds forming in the precipitation of iron sulfate give green colour to the product. The patination material is spread on an oxidized copper surface.

U.S. Pat. No. 5,160,381 describes a method in which artificially formed patina on copper is formed by a) removing impurities, b) polishing with a mixture of acetic acid, copper sulfate, sodium chloride, sodium hydroxide, and copper acetate until a brown colour is obtained c) washing the polish copper substrate, d) brushing and e) after drying submitting said substrate to a filtered solution of hydrochloric acid, copper carbonate, ammonium chloride, copper acetate, arsenic trioxide and copper nitrate.

U.S. Pat. No. 5,714,052 relates to a method for producing brochantite patina on copper by using the copper precursor material as copper coils as an anode in an electrolysis bath, containing for example sodium carbonate. During this step, a green carbonate-sulfite patina is produced on the precursor material. The material is rinsed and moved through a fixing bath, in which the initially formed carbonate-sulfite patina is converted almost entirely into basic copper sulfate, i.e. into brochantite. The fixing bath contains at least one of the oxidation agents: hydrogen peroxide, potassium chlorate, potassium peroxo-disulfate, potassium permanganate and copper sulfate.

U.S. Pat. No. 6,176,905 relates to a process and reaction solution for especially pre-oxidized or partially already patinated copper surfaces. The copper surfaces are applied with a reaction solution comprising an aqueous solution of a copper salt and a basic salt. The well-suited copper salts are copper (I)carbonate, copper(II)carbonate, copper(I)chloride, copper (II)-chloride, copper(II)sulfate, copper acetate, copper nitrate or mixtures thereof. The basic salt is selected from the group consisting of potassium carbonate, sodium hydrogen carbonate, potassium hydrogen carbonate, sodium sulfate etc. The reaction solution of the example contains copper sulfate, sodium carbonate and sodium chloride.

WO application 95/29207 discloses a process for patina formation in which copper sulfate and optionally iron sulfate react with an inorganic hydroxide compound and after that a suitable binder is used. The binder is added to the patina before the patina is spread onto the substrate. The binder is inorganic silicate and its amount is from 100 to 1000 g patina powder per liter binder. A carboxylic acid can be used as a further assistant in adhesion.

U.S. Pat. No. 5,691,001 relates to a method for surface treatment of a copper bearing material. A precipitate is formed by mixing an aqueous solution of at least one copper salt and alkali metal hydroxide, the precipitate is filtered and washed by a capillary filtering. The solids content of the precipitate is adjusted within the range of 15-50% by weight and the precipitate is stored at a temperature below 5° C. until just the surface treatment of the copper bearing material.

U.S. Pat. No. 6,063,480 describes a method for producing a patinated copper plate in which a black copper sulfide layer is first formed on the surface of a copper plate. A resin solution containing basic copper carbonate and/or basic copper sulfate is sprayed on the sulfide layer in such a way that it covers 25% to 80% of said layer. Since portions of the copper sulfide layer remain without no artificial patina it allows a natural patina to form to those portions. Copper material having a patina prepared in a manner described in the patent, has a good formability or the patina layer persists bending, too. Variation of colour tinge limits to changing of the ratio in the proportion of basic carbonate/sulfate particles in the resin solution or the coverage of the surface to be sprayed.

As was stated before, basic copper nitrate is not thermodynamically stable but it changes gradually to more stable basic copper sulfate caused by sulfates from the rainwater or from the oxidation reaction of sulfur dioxide on the metal surface. However, content of sulfur dioxide in the atmosphere has nowadays diminished due to improved air pollution control and so the change from basic copper nitrate to basic copper sulfate takes more time. Rainwater can cause colour changes to an artificial patina during first months and years. A portion of the patina can first dissolve wherein the brown or black oxide or sulfide surface under the patina uncovers and the patina surface darkens from these portions. A portion of the patina surface can react and form copper oxide, which again changes the patina surface into black or brown.

The first cited method uses iron salts for giving the green colour tinge for the patina because both basic copper nitrate and sulfate precipitates are blue in colour without iron. Problem with iron addition is the formation of rust and due to that discolouring of the patina surface. Iron compounds also make the patina layer more oxidizing, which is beneficial for the formation of new patina during exposure. Adequate oxidizing effect is achieved with less iron compared to the amount required for the green colour tinge.

In all of the above-mentioned methods, the aim has been to bring about a green, bluish-green or blue colour tinge imitating a natural patina, on the surface of a substrate. As is said above, success depends in addition to the used copper salts, on other used additional agents and on their amount.

Colour is an important feature of visible parts like roofs and facade of buildings. In new targets, Visual compatibility of the parts of a building constructed from separate materials is very significant factor. Nowadays for example in building architecture, the desire is to create on the surfaces of buildings different tinges of a same colour and even totally different than the colours of the conventional patina.

The present invention relates to a method for producing an artificial patination material wherein a desired colour and/or colour tinge is formed to the patina. A copper oxide layer is first formed on a substrate like copper or copper alloy and a patination material is added above said surface. The whole patina layer is formed as similar as possible to the structure of the natural patina layer. According to the method, the patination material is made of at least one copper salt and, which is precipitated with alkali metal hydroxide. The copper salt is optionally copper sulfate but it may also be copper nitrate, copper chloride, copper carbonate or a mixture of them.

We have noticed that the grain size and colour of the product, which is generated in the precipitation process, can be adjusted by changing the concentration of copper salt and/or alkali metal hydroxide in the solutions used in the precipitation. Dilute solutions produce a precipitate having small grain size. The grain size of the precipitate increases when the concentration increases. The reaction of copper salt and hydroxide is stopped with water the sludge is washed and dried with a suitable filter. Small grain size gives lighter colour and big grain size darker colour to the patination material and to the patina surface produced with it.

It is preferable to disperse the precipitate with effective mixing possibly with the addition of dispersing agent. The dispersion agent can be a suitable commercial product. This separates the agglomerated particles of the precipitate and prevents re-agglomeration. The dispersion makes the ready patination material easy to spread. Another advantage of the dispersion is that the paste is storable at room temperatures instead of earlier refrigerator temperatures. In addition, also the shelf life increases, from four weeks to several months, for example six months.

An addition of a suitable oxidative chemical agent to the patination material is preferential as well as to use agents like carbon, which catalyze forming of sulfate from sulfur dioxide in the atmosphere. When it is desired to achieve colours or colour tinges which differ from the normal patina tinges it is preferable to add at least one inorganic metal compound as colour pigment to the patination material. These compounds are chemically more stabile than the patina particles and they do not react with impurities of the atmosphere. The colours of the patination material dyed according to the invention, are nearly different tinges of green and blue from light to dark but they can also be desired tinges of gray, black, red, yellow or brown.

The invention relates also to a patination material the colour and colour tinge of which can be adjusted as desired by adjusting the grain size and or by using at least one metal compound as a colour pigment. The compound is preferably an inorganic metal compound.

The essential features of the invention will be made apparent in the attached claims.

An iron salt can possibly also be used as a raw material of patination material. The iron salt is optionally iron(III)sulfate but it may also be iron (III)nitrate or iron(III)chloride.

We have noticed that patinaton materials having different grain size, grain form and grain size distribution can be achieved by adjusting of the concentration of chemicals and the feeding rate of the alkali metal hydroxide during the precipitation process. Grain size, grain size distribution and grain form have an effect on the colour shade and durability of the patina layer. The grain size of 0,2-100 µm has been proved out to be advantageous.

A suitable oxidative chemical agent is added to the precipitate of copper salt and alkali hydroxide. This is done before or after the dispersion, depending on the agent used. In addition to the oxidizing function of these agents they also act as colouring agents. The oxidative chemical agent in this case can be iron compound but as the main oxidative agent it is advantageous to use for example manganese dioxide ($MnO_2$). Iron can be added as iron hydroxide, iron(III)oxide or mixtures thereof. Also commercial metal pigment compounds containing these oxidizing agents can be used. The object of this addition is to make the sludge more oxidizing, which is favorable to the stability and adherence of the patina layer. By adding other oxidative chemicals it is now possible to make a patination material without iron or less than conventionally and to diminish rust formation and discolouring problems.

It is also preferable to use agents, which catalyze forming of sulfate from sulfur dioxide in the atmosphere i.e. which add prerequisites for natural patina forming. Such catalyst is for example carbon. Carbon can be added as coal powder, soot or graphite. Also commercial pigments like Mineral Black ($C+SiO_2$) or Black Earth (C) can be used. Carbon additions also have an effect on the colour of the patina paste.

In addition to the colour effect of the oxidizers and catalysers mentioned above, it is advantageous to use also other stable inorganic metal compounds for achieving the desired colour. As the basic sulfate and basic nitrate precipitates of copper are blue in colour, additions of yellow or brown particles make it greener. Yellow colour pigments based on stable metal compounds have more powerful colouring effect on the paste compared to the iron compounds in the precipitate process. It is advantageous to use instead of iron or in addition to the iron added to the precipitation process, for instance colour pigments containing compounds of iron and aluminium, of iron, aluminium and manganese, of iron, aluminium, manganese and silicon or of manganese. Such are for example Mars Yellow ($Fe_2O_3.H_2O+Al_2O_3$), Yellow Ochre ($Fe(OH)_3$), Raw Amber Earth ($Fe_2O.MnO_2.nH_2O+Si+Al_2O_3$) or Siena Natural Earth ($Fe_2O_3.nH_2O+MnO_2+Al_2O_3+SiO_2.2(H_2O)$)) instead or in addition to the iron put in the precipitation process. Also brown pigments like Iron Brown ($Fe_2O_3$), Manganese Brown ($MnO_2$, $Mn_2O_7$), Sienna Burnt ($Fe_2O_3.nH_2O+Al_2O_3+MnO_2$), Burnt Umber ($Fe_2O_3.MnO_2.nH_2O+Si+Al_2O_3$) can be used likewise. Magnetite and tenorite (CuO) give nice dark shade for the green paste.

Also compounds of chromium and copper either together or separately are suitable colour pigments. It has been noticed that stable inorganic metal pigments for achieving green colour are for example Malachite Green ($CuCO_3.Cu(OH)_2$), Opaq Chromium Green ($Cr_2O_3$), in which chromium is its trivalent form, Chrysocolla ($CuSiO_3.nH_2O+Cu_2CO_3(OH)_2+CUCO_3(OH)_2$) and Green Earth (Mg, Al, K), which is a colour pigment formed by magnesium, aluminium and potassium. The amount of the metal compounds used as pigments is minor, usually below 1% of the patination material when the pigment is used for achieving natural patina colour.

In addition or instead of the metals mentioned above, which give conventional patina colour or deepen the colour, other especially inorganic metal pigments can be added to patination material in order to achieve desired colour or colour tinge. The amount of the used pigment is still quite small, in a class of 1 to 5% of the dry matter of the patination material. Above are mentioned pigments of black, yellow, brown and green colour and their use in order to form natural patina tinge. Patination material of corresponding colour (yellow, brown, green) can be achieved, too, by adjusting the ratio of these pigments. Different tinges of blue can be formed by using for example Egypt Blue, calcium copper silicate, $CaCuSi_4O_{10}$, which is chemically very stable pigment. With the pigments of black colour mentioned above, also green colour can be changed to grey or achieve different tinges of livid.

When copper sulfate is used as a raw material of patination material, the reaction with alkali metal hydroxide form brochantite ($Cu_4SO_4(OH)_6$) or posnjakite ($Cu_4SO_4(OH)_6.2H_2O$). Posnjakite is a product forming in nature and it changes gradually to brochantite during some years. It may be advantageous to have also posnjakite in the patina since it gives more vividness to the surface when changing to brochantite.

In preparation of patina, it is also a purpose that patina adherence to the substrate is good and that patina surface is durable. This can be improved by adding a binder to the patination material. Sodium silicate has been commonly used as a patina binder and it has been sprayed onto the patina surface after the patina has been spread on the substrate. Now we have noticed that it is advantageous to use an alkyd-based compound as a binder and add it to the proper patination material during the pasta preparation. Adding of the binder to the paste in connection of preparation does not shorten the storage time. The amount of the binder is at highest 10% of the patination material dry matter, preferably 2-3%. The amount of dry matter in the patination material is from 15-50%. The amount of binder is so adjusted, that after application the patina layer is firmly attached to the substrate. The patina particles are not totally but only partially covered by the binder. This leaves the patination material particles exposed to the atmosphere so that natural patination reactions can proceed.

Using of binder is not always necessary but advisable. The grain size of the patination material has significance to the durability of the patina surface. Some test campaigns with posnjakite as the main component, grain size with flat distribution curve between 0,2-80 μm gave good results. This type of paste gives very durable patina layer with good adherence even without any binder.

Patina gel according to this invention can easily be applied with brush, roller or spraying. The paste also is storable for prolonged times in ambient temperatures. The paste can be used in on site application as well as for prepatinated elements or sheets. The durability of the patina layer achieved makes it possible to form the patinated sheets and make profiles for architectural usage. The oxidative agents and catalysing carbon compounds in the patina layer aid natural reactions with the atmosphere and the formation of new natural patina.

The invention is described more by aid of the following example:

EXAMPLE 1

The precipitation process is carried out in a reactor of five cubic meters. Proper mixing is achieved with an agitator placed about 400 mm above the bottom of the reactor. This makes it possible to use considerably low concentration in the process solutions if wanted. This is important if we want to make batches of different grain size and grain form. 475 liters of tap water is added to the reactor. 100 kilos of copper sulfate with 27% of copper is mixed in with constant agitation. After the copper sulfate is completely dissolved, 4 kg of ferric sulfate with 21-23% of iron is added. 714 liters of 1 mol sodium hydroxide solution is pumped in the reactor and the precipitation is allowed to happen. The process is stopped by pumping in 1960 liters of tap water. The precipitate is allowed to settle for a few hours. The clear liquid is pumped off and the precipitate is taken to a ceramic filter for washing. After the washing and filtering, the precipitate contains 20 to 30% of solids and less than 0.1% of alkaline ions.

The produced precipitate is pumped into a dissolver for dispersion. 200 g of carbon powder, 300 g of manganese dioxide ($MnO_2$), 1 liter of Malachite Green ($CuCO_3 \cdot Cu(OH)_2$) and 2 liters of commercial dispersing agent is added. After the dispersion process 15 liters of alkyd binder in water solution is added with slow mixing. The product is mainly brochantite with 20 to 30% of solids with a grain size of 0,5 to 12 microns. The product is packed in plastic barrels and stored in room temperature.

The prepared product was applied to three sets of brown oxidized copper plates. The application was made with brush, brush and roller or with spray gun respectively. Two plates of each set and were taken to a cabinet test. Brown oxidized plates and bare copper plates were put in as reference.

| Cabinet test: | |
|---|---|
| Solution: | artificial rainwater |
| chemical | mmol |
| NaCl | 10.0000 |
| $NH_4NO_3$ | 0.0400 |
| $K_2SO_4$ | 0.0031 |
| $MgSO_4 \cdot 7H_2O$ | 0.0049 |
| $CaSO_4 \cdot 2H_2O$ | 0.0050 |
| $H_2SO_4$ | 0.0230 |
| Temperature: | 50° C. |
| Spray: | 30 min/h at a rate of 0.8 l/h |
| Duration | 250 h |

Visual inspection after the test showed, that all the patinated samples were almost intact. The bare copper samples had turned dark brown. The oxidised plates had white areas and some loss of black oxide on the surfaces, like we have seen on oxidised copper samples exposed for two years at our marine corrosion station.

The invention claimed is:

1. A method for preparing an artificial patination material for a copper containing substrate said method comprising: using at least one copper salt as a raw material, precipitating said raw material with an alkali metal hydroxide to form a sludge; filtering a precipitate from the formed sludge; stopping the reaction between the raw material and the alkali metal hydroxide with water; dispersing the precipitate with powerful mixing and an addition of a dispersing agent; and in addition, using both an oxidative agent and carbon as an agent for catalysing natural patina forming and at least one stable metal compound as a colour pigment for achieving a desired colour and/or colour tinge, wherein a part of the patination material is posnjakite ($Cu_4SO_4(OH)_6 \cdot 2H_2O$) with a grain size between 0.2-80 μm.

2. A method according to claim 1, wherein said copper salt is selected from the group consisting of copper sulfate, copper nitrate, copper chloride, and copper carbonate.

3. A method according to claim 1, wherein said copper salt is copper sulfate.

4. A method according to claim 1, wherein said oxidative agent is manganese dioxide.

5. A method according to claim 1, wherein said raw material includes an iron compound.

6. A method according to claim 1, wherein said oxidative agent is an iron compound.

7. A method according to claim 1, wherein said colour pigment is an inorganic metal compound.

8. A method according to claim 1, wherein said colour pigment is an iron compound.

9. A method according to claim 1, wherein said colour pigment is an iron and aluminum compound, an iron, manganese, and aluminum compound, or an iron, manganese, silicon and aluminum compound.

10. A method according to claim 1, wherein said colour pigment is a manganese compound.

11. A method according to claim 1, wherein said colour is a copper compound.

12. A method according to claim 11, wherein said colour pigment is a copper carbonate compound, a copper silicate-copper carbonate compound, or a calcium copper silicate compound.

13. A method according to claim 1, wherein said colour pigment is a chromium (III) compound.

14. A method according to claim 1, wherein said colour pigment is a magnesium- aluminum- and potassium compound.

15. A method according to claim 1, wherein said colour pigment is coal.

16. A method according to claim 1, wherein the amount of the colour pigment in the patination material dry matter is no more than 5%.

17. A method according to claim 1, further comprising using an alkyd-based compound as a binder and adding the binder to the patination material during its preparation.

18. A method according to claim 17, wherein the amount of the binder is no more than 10% of the patination material dry matter.

19. A method according to claim 1, wherein the amount of dry matter in the patination material is between 15-50%.

20. An artificial patination material for copper containing substrates wherein at least one copper salt is used as a raw material, precipitated with an alkali metal hydroxide and the formed sludge filtered for forming a precipitate paste, wherein the reaction between the raw material and the alkali metal hydroxide was stopped with water, the precipitate dispersed with powerful mixing and an addition of a dispersing agent, and the paste contains an oxidative agent and carbon for catalysing natural patina forming and at least one stable metal compound is used as a color pigment for achieving desired color and/or color tinge, wherein a part of the patination material is posnjakite ($Cu_4SO_4(OH)_6 \cdot 2H_2O$) with a grain size between 0.2-80 μm.

21. A patination material according to claim 20, wherein an alkyd-based compound is used as a binder.

22. A patination material according to claim 21, wherein the binder covers only partially the patination material particles.

23. A patination material according to claim 21, wherein the amount of the binder is no more than 10% of the patination material dry matter.

24. A patination material according to claim 20, wherein said copper salt is selected from the group consisting of copper sulfate, copper nitrate, copper chloride, and copper carbonate.

25. A patination material according to claim 20, wherein said copper salt is copper sulfate.

26. A patination material according claim 20, wherein a grain size of the patination material particles is between 0.2-100 μm.

27. A patination material according to claim 20, wherein the amount of dry matter in the patination material is between 15-50%.

28. A patination material according to claim 20, wherein said color pigment is an inorganic metal compound.

29. A patination material according to claim 20, wherein said color pigment is an iron compound.

30. A patination material according to claim 20, wherein said color pigment is an iron and aluminum compound, an iron, manganese and aluminum compounds or an iron, manganese, silicon and aluminum compound.

31. A patination material according to claim 20, wherein said color pigment is a manganese compound.

32. A patination material according to claim 20, wherein said color pigment is a copper compound.

33. A patination material according to claim 32 wherein said color pigment is a copper carbonate compound, a copper silicate-copper carbonate compound or a calcium copper silicate compound.

34. A patination material according to claim 20, wherein said color pigment is a chromium(III) compound.

35. A patination material according to claim 20, wherein said color pigment is a magnesium, aluminum and calcium compound.

36. A patination material according to claim 20, wherein said color pigment is coal.

37. A patination material according to claim 20, wherein the storage time of the artificial patination material is several months.

38. A patination material according to claim 20, wherein the paste is storable in room temperature.

39. A patination material according to claim 20, wherein the amount of the color pigment is no more than 5% of the patination material dry matter.

* * * * *

UNITED STATES PATENT AND TRADEMARK OFFICE
CERTIFICATE OF CORRECTION

PATENT NO. : 8,388,768 B2  Page 1 of 1
APPLICATION NO. : 10/510568
DATED : March 5, 2013
INVENTOR(S) : Tapio Korpinen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 476 days.

Signed and Sealed this

First Day of September, 2015

Michelle K. Lee
*Director of the United States Patent and Trademark Office*